INVENTOR.
MORRIS C. JONES JR.

INVENTOR.
MORRIS C. JONES JR.
ATTORNEYS

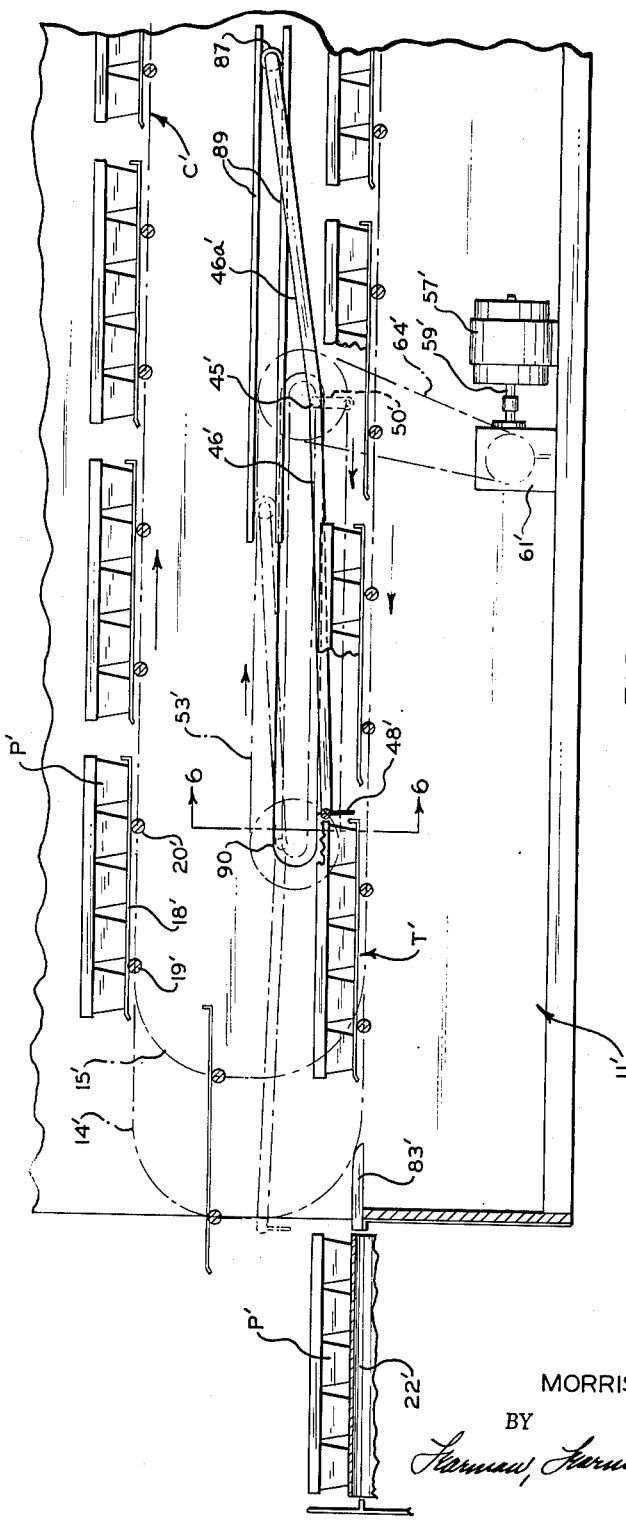

Aug. 24, 1965     M. C. JONES, JR     3,202,115
PUSHER TYPE TRANSFER APPARATUS FOR BAKING
OVENS AND THE LIKE
Filed Aug. 21, 1961     6 Sheets-Sheet 6
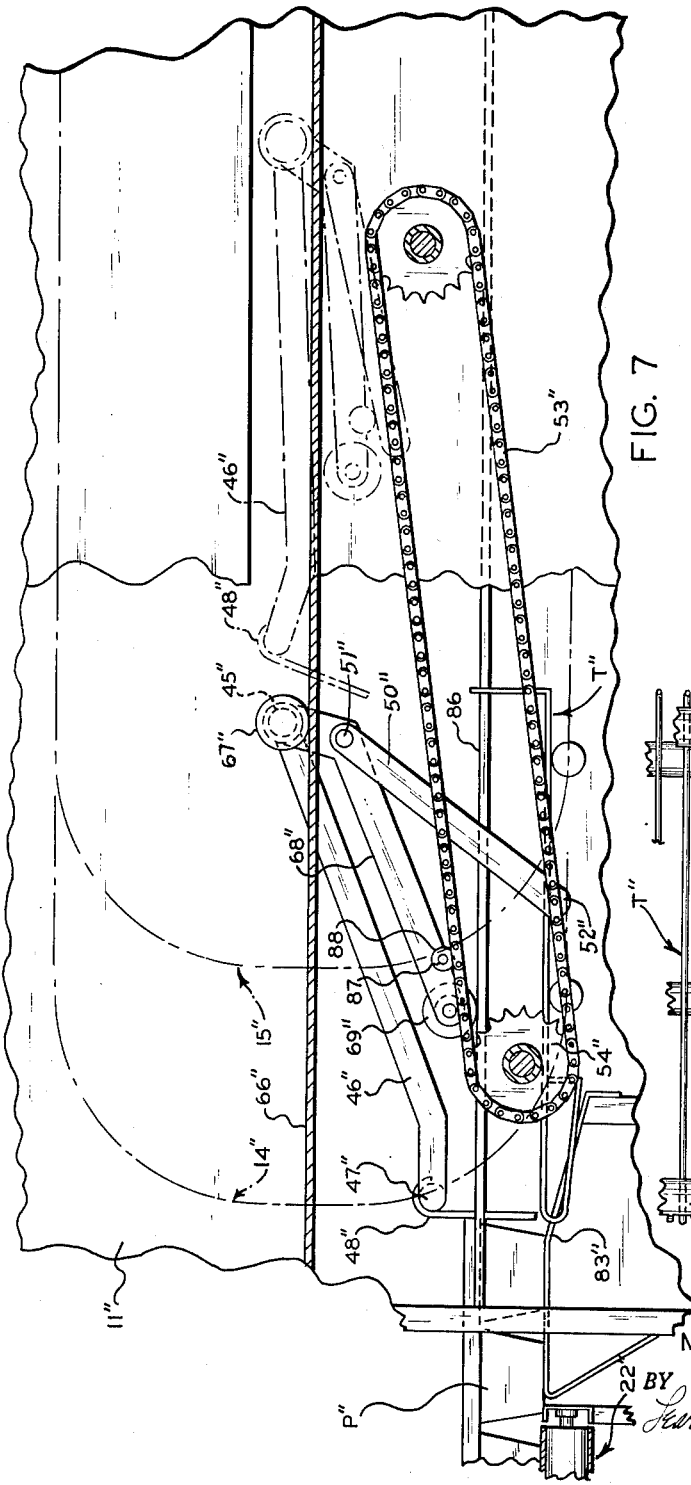
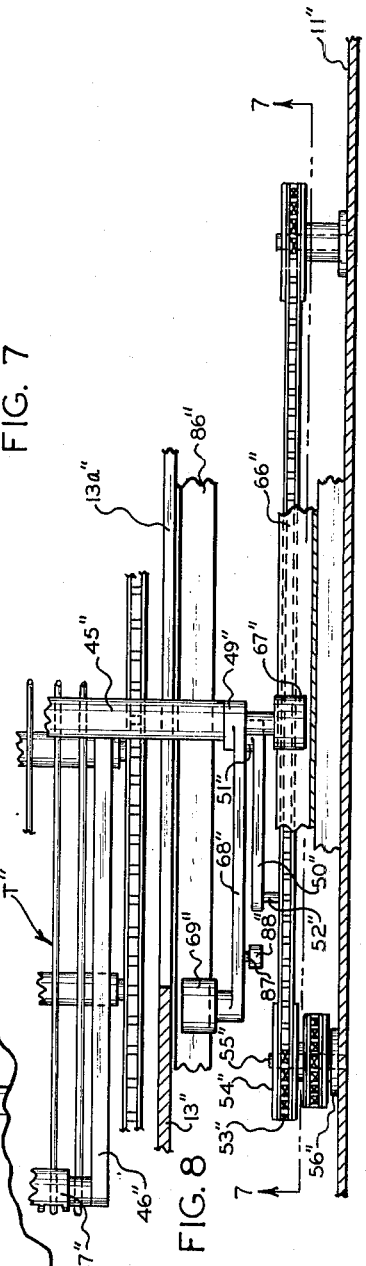
*INVENTOR.*
MORRIS C. JONES, JR.
BY
ATTORNEYS United States Patent Office 3,202,115
Patented Aug. 24, 1965

3,202,115
PUSHER TYPE TRANSFER APPARATUS FOR BAKING OVENS AND THE LIKE
Morris C. Jones, Jr., Saginaw, Mich., assignor to Baker Perkins Inc., Saginaw, Mich., a corporation of New York
Filed Aug. 21, 1961, Ser. No. 132,840
28 Claims. (Cl. 107—57)

This is a continuation-in-part of application Serial No. 51,636, filed August 24, 1960, and now abandoned.

This invention relates to transfer apparatus and more particularly to certain novel and useful improvements in pusher apparatus for loading and unloading pans containing bread, rolls, cakes, and the like horizontally to and from baking ovens.

One of the prime objects of the present invention is to design pusher type transfer apparatus which can operate while the oven tray conveyor is moving to furnish pans from the supply conveyor to the oven tray conveyor and unload pans from the oven tray conveyor to a discharge conveyor. With the emphasis today in modern bakeries on speed and quantity of product that can be handled in a given time period, it has become important to design transfer apparatus of this character which can be used to transfer relatively shallow bun and cake pans, and pans having Pullman lids, as well as pan sets of bread, to and from the oven without slowing or interrupting the travel of the oven conveyor.

Unloading apparatus for tilting the trays when they reach the discharge station, to remove the pans by gravity, has been designed for continuously operating oven conveyors. However, when such apparatus is used to unload trays with Pullman lids, the lids often fall off and when used with bun pans and cake pans, which are, of course, of shallow depth, product damage is frequent.

An important object of the present invention is to design apparatus of the type described which is operable with a continuously traveling, high speed oven tray conveyor, having a range of speeds for baking both bread and buns, to push the pans in a horizontal path during the transfer operation.

A further object of the invention is to provide unloader apparatus designed to dispose bearings outside the actual oven chamber so that they can be serviced without interrupting the operation of the oven.

A further object of the design of the present invention is to avoid the undue wear which occurs when intermittently operated elements are employed and at the same time to avoid synchronization problems.

Another object of the invention is to design simple and practical oven pusher mechanisms of highly reliable character which can be economically manufactured and sold.

Other objects and advantages of the invention will be pointed out specifically or will become apparent from the following description when it is considered in conjunction with the appended claims and the accompanying drawings, in which:

FIGURE 1 is a sectional, side elevational view illustrating the interior of the oven chamber and the position of the unloader parts therein at a time when the loader has just completed a loading operation and the unloader pusher has just come into engagement with a pan set and is about to move it to the discharge conveyor, the diagrammatic lines indicating the oven chain conveyors and other endless conveyors schematically;

FIGURE 5 is a somewhat schematic, sectional, side elevational view illustrating a modified embodiment of the unloader apparatus;

FIGURE 7 is a fragmentary, sectional, side elevational view taken on line 7—7 of FIG. 8 illustrating another modified embodiment of the unloader apparatus, with the unloader pusher member in forward position; and FIGURE 8 is a fragmentary top plan view of one side thereof.

Figure 1:
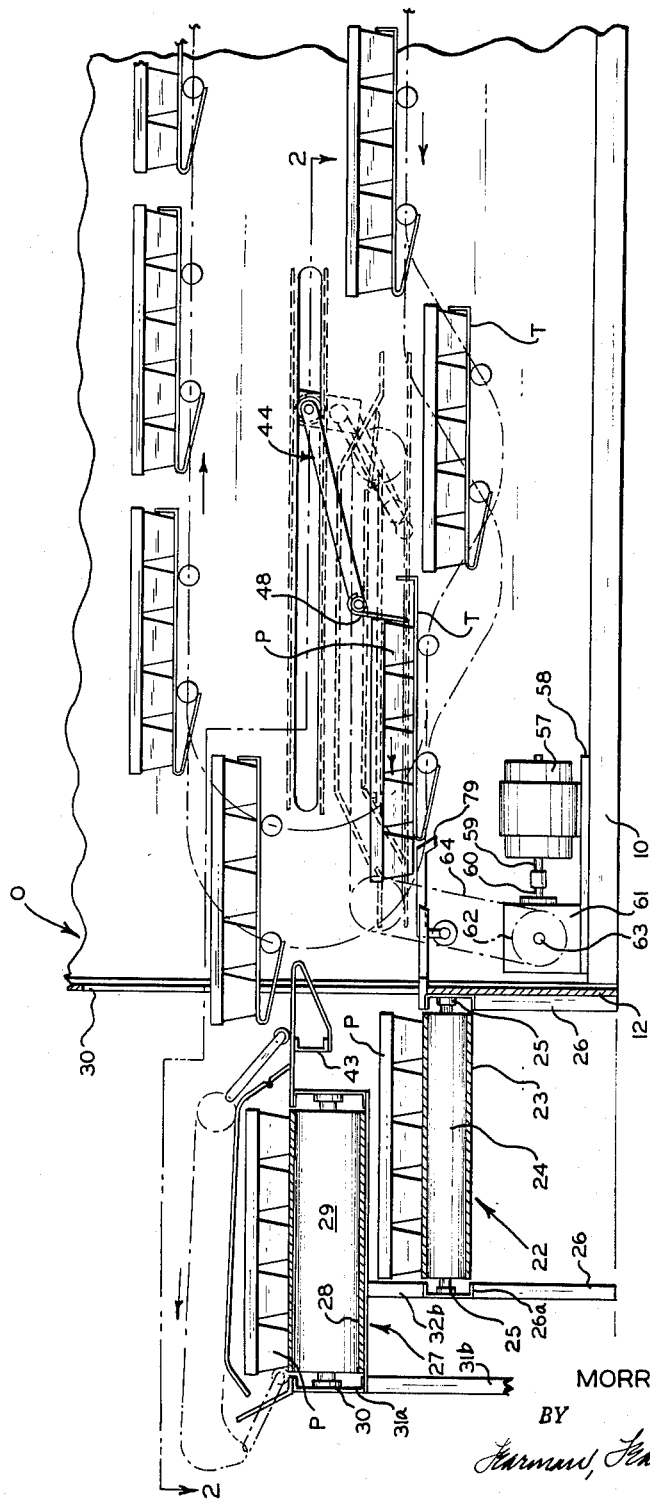
Figure 2:
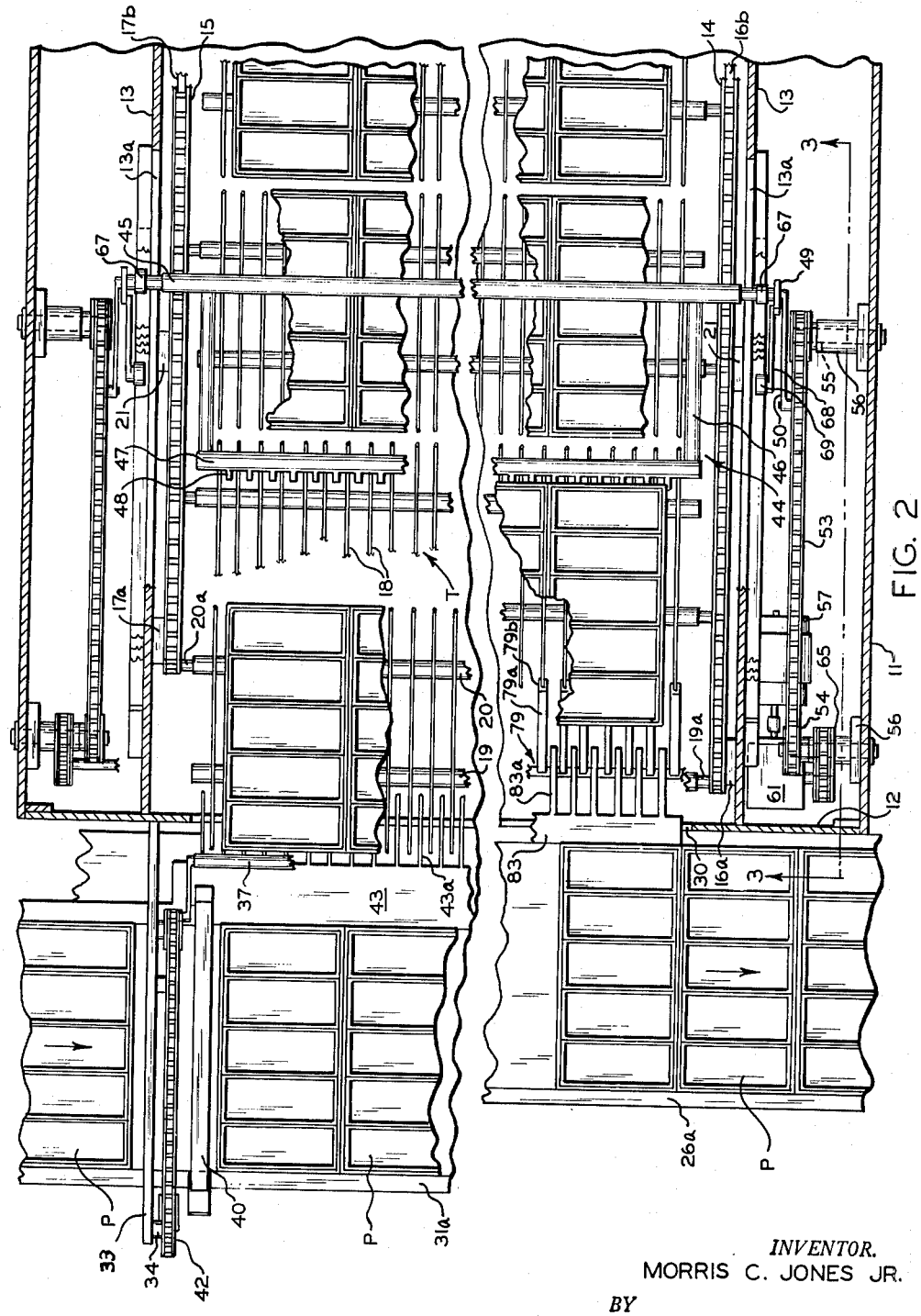
FIGURE 2 is a sectional, top plan view taken on the line 2—2 of FIGURE 1.

Referring now more particularly to the accompanying drawings in which, in FIGURES 1–4, a first embodiment of the invention is shown, a letter O generally indicates an elongate, hearth-type baking oven of conventional type having bottom members 10, outer side walls 11, a front wall 12, and top and rear walls (not shown) which form the usual oven enclosure, and within which a tray conveyor C of endless type is usually disposed. As shown in FIGURE 2, the oven O has insulated, interior side walls 13 spaced from the outer side walls 11 so that the outer walls 11 can house unloader operating and guiding mechanism which will be presently described. With the construction depicted the unloader mechanism bearings are disposed remotely from the heat of the oven chamber and the burner members (not shown) in the oven can be positioned closer to the front of the oven than previously. Access doors (not shown) provided in the outer side walls 11 can be removed to permit servicing of the bearings situated between the walls 11 and 13 without interrupting the operation of the oven conveyor.

The tray conveyor, generally indicated by the letter C, includes at least a pair of link chains 14 and 15 (see FIGURES 2 and 3) on opposite sides of the oven chamber which can be supported by guides 16 and 17, fixed on support blocks 16a and 17a, respectively, and by upper and lower generally longitudinally extending, stationary guide members 16b and 17b rearward thereof. The grid type trays, which are generally referred to by the letter T, comprise a series of transversely spaced apart, longitudinally extending grid rods 18 welded to front and rear connecting members 19 and 20 which substantially span the width of the oven chamber as shown in FIGURE 2. At their front ends the grid rods 18 are bent reversely, as at 18a, and are welded to both the upper and lower surfaces of the front connecting member 19, and at their rear ends the rods 18 are turned upwardly, as at 18b, to prevent the pan sets generally designated P from being pushed off the rear ends of the trays T. The front rods 19 of the trays have extensions 19a which are pivotally supported as at 19b by the endless chain conveyor 14 in the usual manner, and the rear cross supports 20 have extensions 20a which in the same manner pivotally connect as at 20b to the endless chain conveyor 15.

The upper and lower conveyor guides 16b and 17b are supported from the side walls 13 by brackets 21 in any suitable manner. Of course, in place of conveyor support members 16 and 17, and 16b and 17b, various combinations of sprockets could be employed. Each of the endless chain conveyors 14 and 15 includes lower, generally longitudinal runs 14a and 15a, generally vertically extending runs 14b and 15b traveling around the guides 16 and 17, respectively, and generally horizontally extending upper runs 14c and 15c.

Supported substantially in line with the terminal portions of the lower runs 14a and 15a is a discharge conveyor, generally indicated at 22, which may be in the form of an endless belt 23 supported by powered rollers 24 which are journaled in bearings 25 provided on the side plates 26a of support leg members 26. Mounted above the discharge conveyor 22, and in generally superposed relationship therewith, is a pan set supplying conveyor or loading shelf generally indicated at 27. The conveyor 27 may similarly take the form of a belt conveyor including an endless belt 28 and powered rollers 29 journaled in bearings 30a provided on the side plates 31a supported by legs 31b and 32b. It will be seen that the front wall 12 of the oven O is open, as at 30, opposite conveyors 22 and 27.

Figure 4:
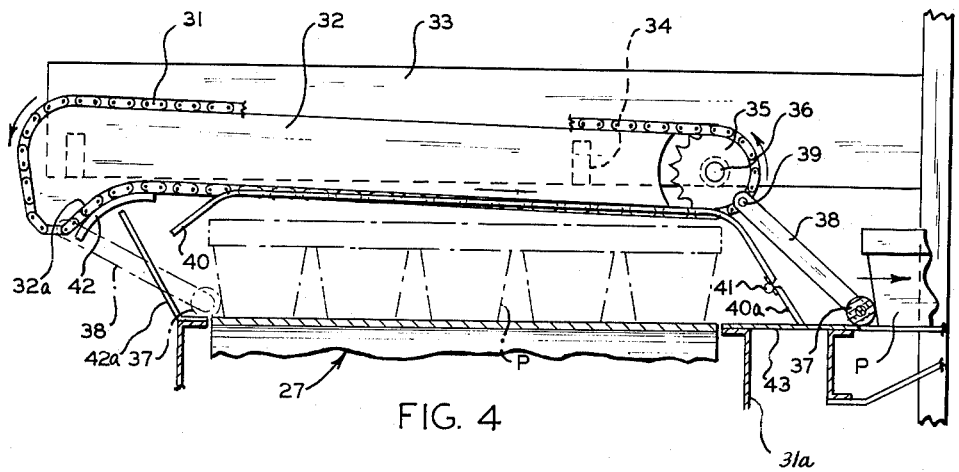
FIGURE 4 is an enlarged, fragmentary, sectional, side elevational view illustrating the operation of the loader pusher bar.

Loading transfer apparatus of novel character is illustrated particularly in FIGURES 2 and 4 and comprises transversely spaced apart endless chains 31 trained around guides 32 supported by walls 33 and end brackets 34. Sprockets 35 mounted on a drive shaft 36, which can be powered from the oven conveyor chains 14 and 15 or any suitable motor, are provided to drive the chains 31 continuously. While only a single chain 31 is shown in FIGURE 4, it is to be understood that a pair of identically supported chains are preferably provided. Mounted by the chains 31 is a pusher shaft 37 spanning links 38 which are pivotally connected to the chains 31 at 39.

Tracks 40 supported a spaced distance above the conveyor 27 laterally inwardly of the chains 31 include end sections 40a which are hinged as at 41 to main sections 40. As indicated in FIGURE 4, the track sections 40a may be swung in a counterclockwise direction about the hinges 41 sufficiently to permit the shaft 37 to pass on the forward stroke of the loader but are prevented from hinging in the opposite direction and accordingly provide a cam or guide surface for the shaft 37 during the return stroke.

It will be seen that the chain guide members 32 include the upwardly and forwardly directed surfaces 32a and arcuate track sections 42 are provided at a slightly spaced apart distance therefrom sufficient to permit the chains 31 to pass without binding. The purpose of this construction is to permit the pusher 37 to engage and initially move the pan set P at a relatively slow rate of speed so that the proofed dough in the pan sets is not jarred and deflated. Also, guides 42a for the pusher shaft 37 are provided at a spaced distance forwardly of the front ends of tracks 40.

In FIGURE 4, the diagrammatic lines at the left end of the view indicate the pusher shaft 37 in a position in which it has just engaged the pan sets P. Obviously, the links 38 are, in this portion of the travel of the chains 31, moving upwardly as well as forwardly, so that the movement is gently begun and uniformly accelerated. When the pusher shaft 37 is in the position in which it is shown in solid lines (FIGURE 4), the chains 31 are moving upwardly around sprockets 35 and thus the travel at the end of the stroke is slowed to avoid jarring the proofed dough. A bridging plate 43, provided with grid fingers 43a which are arranged to permit the tray grid rods 18 to pass between them, is supported on the inner side bracket 31a as shown.

Figure 3:
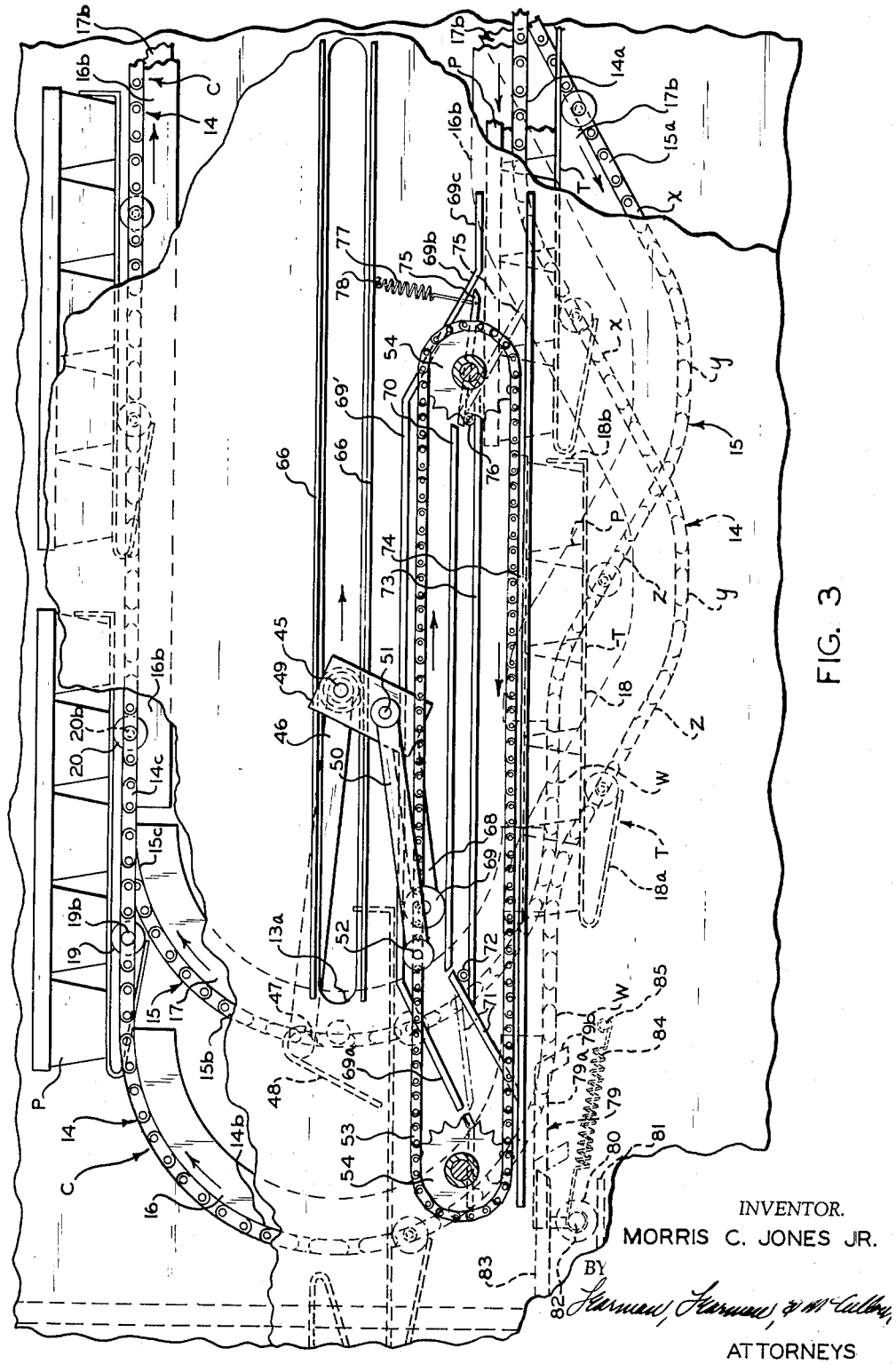
FIGURE 3 is an enlarged, fragmentary, sectional, side elevational view taken on the line 3—3 of FIGURE 2 with a portion of the interior wall of the oven chamber being broken away in part, the unloading apparatus being shown in a forward position, however.

Unloading apparatus in one form is illustrated particularly in FIGURES 2 and 3 and comprises a pusher rake generally designated 44 which includes a main shaft 45, side members 46, a front tine-supporting shaft 47, and fingers or tines 48 which are arranged to pass between the tray grid rods 18. The shaft 45, which is of a length to extend out elongate, slotted openings 13a provided in the oven chamber walls 13 is fixed at its ends to plate members 49 which are outside the walls 13. Links 50, pivotally connected to the plates 49 as with bearings and pivots 51, are also pivotally connected as with bearings and pivots 52 to endless drive chains 53 which, as shown in FIGURE 2, are mounted on sprockets 54, supported by shafts 55, which are supported in bearings 56 anchored in the side walls 11. A motor 57 (FIGURE 1) mounted on a platform 58 has an armature shaft 59 coupled to the input shaft 60 of a gear reduction box 61, and a sprocket 62 mounted on the gear reduction box output shaft 63 is connected by a chain 64 to a drive sprocket 65 on the front shaft 55.

Vertically spaced, longitudinally extending guide track members 66 are mounted on the inner side walls 13 adjacent the marginal edges of the slots 13a therein and support guide roller members 67 rotatable on the shaft 45 which are free to travel between the guides 66 but are, of course, restricted from the standpoint of vertical movement. The rollers 67 constitute a forwardly and rearwardly moving pivot for arms 46. As the chains 53 move around the sprockets 54, the plates 49 are tilted in a manner to be described and this movement raises or lowers the arms 46 and fingers 48 in the manner desired. Also fixed to the plates 49 are movement controlling guide arms 68 which have guide roller members 69 rotatably mounted thereon. An upper pair of tracks 69' and 70 guide the rollers 69 when the arms 50 are traveling along the upper runs of endless chains 53. The track members 69' have sloped front portions 69a, sloped rear portions 69b, and rearmost portions 69c, and restrict upward movement of the rollers 69 when the pusher member 44 is traveling rearwardly. The track members 70 are provided to restrict any downward movement of rollers 69. At the front end of guides 70 are gravity biased tracks 71 which are hingedly supported by the inner side walls 13 at 72 to swing from the solid line position (FIGURE 3) to the broken line position to pass the rollers 69 when they are traveling forwardly between the lower pair of track members 73 and 74 at a time when links 50 are moving along the lower runs of endless drive members 53. Also, at the rear ends of track sections 70, track sections 75 are provided, hinged to the walls 13 at 76, so as to be swingable away from the solid line position shown in FIGURE 3 to the diagrammatic line position also shown. Coil springs 77 which can be connected to lower track member 66 as at 78 are fixed to the free end of each of the track sections 75 to normally maintain them in the solid line position shown.

It will be seen that each of the generally longitudinal lower runs of the chains 14 and 15 include a downwardly sloped run section indicated at x which extends down from the longitudinal line of the lower runs of the conveyors 14 and 15, dwell run portions y, upwardly directed run portions z, and longitudinally directed run portions w adjacent the guides 16 and 17. The lower guides 16b and 17b are, of course, configured to support the chains 14 and 15 in this path of travel. By following the path descrbied the trays T permit the fingers 48 to move in behind the pan sets P when the trays T reach the run portions w of chains 14 and 15 without interfering with the travel of a following tray. With the trays T in effect being lowered because of their path of travel, the pusher 44 can swing downwardly prior to the time the trays T are in extreme forward position.

Mounted opposite the run portions w is a forwardly displaceable bridge member 79 which is mounted on rollers 80 supported on track sections 81. As shown in FIGURE 3, the bridge member 79 comprises a shaft 82 mounting fingers 79a which are downwardly turned as at 79b, the grid fingers 79a being arranged to pass between the grid rods 18 of the trays T. So that it will not interfere with the operation of the pusher fingers 48, the rod portions 18a of the trays T will push the bridge member 79 forwardly from the position in which it is shown in broken lines in FIGURE 3 to the position in which it is shown in diagrammatic lines. Rearwardly of the movable grid member 79, a stationary grid plate 83 is provided which has the rearwardly extending grid fingers 83a intersecting the grid fingers 79a, as shown. Spring members 84 connected to the shaft 82 and to the side walls 13 at 85 normally urge the movable grid member 79 to inward position.

In operation the motor 57 is driven continuously, as are rear sprockets (not shown) driving the chains 14 and 15 from a conventional motor through variable speed drive mechanism in the usual manner. The chains 53 could be driven directly by the motor driving chains 14 and 15, if desired. In FIGURE 1 a tray T has reached the run portions w of the conveyors 14 and 15, and the pusher 44 is in a position in which it has engaged and is pushing the pan set P in a forward direction. The guide rollers 69 have passed from the track portions 69c forwardly beyond the normally raised track sections 75 and are traveling forwardly between the lower pair of track sections 73 and 74 as the lower runs of chains 53 move the pusher apparatus forwardly. The reversely turned grid rod portions 18a of the tray T are about to engage the movable grid 79 and push it forwardly to the position in which it is shown in diagrammatic lines in FIGURE 3.

While both the trays T and pusher apparatus 44 are in this instance moving forwardly, it should be understood that the fingers 48 are moving forwardly at substantially four times the rate of speed of the trays T so that the pan sets P are pushed across the grid plate 83 and onto the discharge conveyor 22 before the trays T move forwardly sufficiently to travel very far upwardly. During the forward stroke of the pusher apparatus 44, the rollers 69 swing the track sections 71 upwardly and pass forwardly of them so that the track sections 71 can then return from the diagrammatic line raised position in which they are shown in FIGURE 3 to the position in which they are shown in solid lines in FIGURE 3. The arm members 50 have been traveling along the lower runs of conveyors 53 and, as they rise upwardly around the front sprockets 54 and move rearwardly, the rollers 69 first move rearwardly several inches linearly, and thence move up the inclined track sections 71 and in so doing tilt the plates 49 (compare FIGURES 1 and 3) and accordingly raise the arms 46 and fingers 48 to a position in which they clear the rear support shaft 20 of the tray unloaded as the trays T move upwardly and the fingers 48 move rearwardly. Because fingers 48 move rearwardly initially to clear the pans before rising there is no possibility of Pullman lids being knocked off the pans. The pusher apparatus 44 must return to rearward position by the time the following tray T has moved forwardly on the conveyors 14 and 15 a short distance so as to be in position to swing in behind the pan sets P thereon. When the rollers 69 near the rear ends of track sections 70 they depress track sections 75 to the diagrammatic line positions in which they are shown in FIGURE 3 and pass rearwardly beyond the track sections 75 between the sections 69c and rear ends of track sections 74. This downward travel of rollers 69 results in righting of the plate sections 49 and lowering of the arms 46 and tines or fingers 48. By this time the tray following the tray to be next unloaded has commenced to move downwardly on the portions x of the chain conveyors 14 and 15 to the dwell portions y.

Once a tray T is emptied in the manner described, it moves upwardly toward the bridge plate 43. In the meantime, the outer pusher shaft 37 is traveling rearwardly on the upper run of conveyors 31 and proceeding downwardly between members 42a and 40 to the position indicated by the diagrammatic lines in FIGURE 4 into engagement with a pan set P containing proofed dough on the conveyor 27. As the tray T travels up to a position opposite the grid plate 43, the pusher shaft 37 moves the pan set P forwardly in the manner indicated, across the grid plate 43 and to the empty tray T. The operation is so synchronized that by the time the pan set extends sufficiently beyond the grid plate 43 that it would fall by the force of gravity, the tray T is in supporting position, and of course the forward portions of the grid rods 18 of the tray T pass upwardly between the fingers 43a of the grid plate 43.

Figure 6:
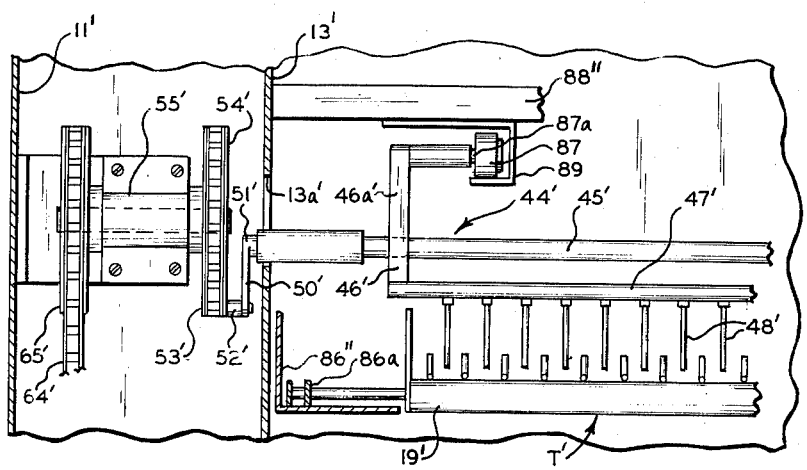
FIGURE 6 is an enlarged, fragmentary, sectional, end elevational view taken on the line 6—6 of FIGURE 5, a forward raised position of the unloader parts being illustrated with diagrammatical lines.

In FIGURES 5 and 6 I have shown a modified embodiment of the invention in which similar "primed" numerals have been used to designate identical parts. Thus, the oven is generally designated 11' and the tray conveyor C', and the trays T' which have grid rods 18' travel, as before, on conveyor chains 14' and 15' which are only indicated diagrammatically. Guides 86 support rollers 86a on the extended ends of tray shafts 19' and 20'.

The unloader apparatus 44' in this case comprises a shaft 45' mounting arms 46' which support a cross shaft 47' and rake fingers 48'. In this instance the arms 46' include rearwardly extending integral portions 46a' which mount rollers 87, as shown, on shafts 87a. A cross member 88 (FIGURE 6) spanning the walls 13' supports the tracks 89 which guide the unloader apparatus 44' in its forward and rearward travel. While only one end of the unloader apparatus 44' has been shown in FIGURE 6 it is to be understood that the opposite end is identical.

The shaft 45' is similarly connected to the unloader apparatus drive chains 53' by arms 50', as shown, the pivotal connections between the chains 53' and links 50' being indicated at 52' and the fixed connection to shaft 45' being indicated at 51'. The chains 53' which are trained around sprockets 54' are mounted on shafts 55', as before, and driven from a sprocket 65' around which drive chain 64' is trained.

In FIGURE 5 the shaft 45' is shown in rearward position, its path of travel being schematically indicated by the numeral 90. When the arms 50' are traveling on the lower run of the conveyors 53', the fingers 48' are moved forwardly to push the pan sets P' from the trays T' to the bridge plate 83' and discharge conveyor 22'. The trays T' are then in position to be loaded by loading apparatus similar to that described previously. As the arms 50' travel upwardly around the front sprockets 54' the arms 46' are lifted and it is important to note that the slots 13a' in the oven inner chamber walls 13' are vertically enlarged to permit the lifting movement. In this manner, the fingers 48' are raised, and as the arms 50' move rearwardly on the upper run of conveyors 53' the arms 46' are retracted to rearward position. As arms 50' descend, when the chain links bearing them descend around the rear sprockets 54', the arms 46' and fingers 48' are, of course, lowered into position behind the pan sets on a tray T' wihch has, in the meantime, moved into position for discharge.

In a presently preferred embodiment of the invention shown in FIGURES 7 and 8 I have shown double prime numerals to designate the parts identical to or similar to the parts shown in FIGURES 1–4. Thus, the outer side walls of the oven are generally designated 11" and oven trays T" travel therein on conveyor chains 14" and 15" which are only indicated diagrammatically. A tray T" is shown at the front end of the lower longitudinal run portion of the oven conveyor chains 14" and 15" longitudinally opposite the grille fingers 83" which support the pan set P" as it is being transferred to the discharge conveyor 22".

The unloader apparatus 44" in this case comprises a shaft 45" mounting arms 46" which support a cross member 47" and dependent rake fingers 48". The shaft 45", which is of a length to extend out elongate, slotted openings 13a" provided in the oven chamber walls 13", is fixed near its ends to plate members 49" as shown. Links 50", pivotally connected to the plates 49" as with bearings or pivots 51", are also pivotally connected as with bearings or pivots 52" to vertically inclined endless drive chains 53" which are trained around sprockets 54"

on the shafts 55″, the shafts 55″ being supported by bearings 56″ anchored on the side walls 11″.

The sprockets 54″ are driven by a motor in the same manner as previously. Horizontally extending channel guides 66″, supported by the framework, journal roller members 67″ which are rotatable on the ends of shafts 45″ and these roller members 67″ are free to travel horizontally along the upper surfaces of guides 66″ but are prevented from moving downwardly. As previously, the rollers 67″ constitute a forwardly and rearwardly moving pivot for arms 46″ with the plates 49″ fixed on the shaft 45″ raising or lowering the arms 46″ and fingers 48″ as before. Mounted on the plates 49″ at each side of the apparatus and rigidly fixed thereto are movement controlling guide arms 68″ which journal roller members 69″ for movement back and forth along horizontal angle guide members 86″ supported by the wall 13″. Also fixed to the arms 68″ on shafts 87″ are padded bosses 88″ which, as shown in FIGURE 8, overlie the arms 50″ and are lifted by the arms 50″ when the pins 52″ are moving along the upper runs of the endless conveyor chains 53″.

While only a top view of one side of the oven is shown in FIGURE 8, it is to be understood that the opposite side is identical except that a shaft from the motor mentioned can be employed to drive sprockets 54″ in the manner of FIGURE 2. It will be assumed, for purposes of the disclosure, that the lower runs of the chains 14″ and 15″ are configured as shown in FIGURE 7. In operation, the chains 53″ and oven chains 14″ and 15″ may be driven continuously, as previously. In FIGURE 7 the pusher 44″ is in the position in which it is pushing the pan set p″ in a forward direction toward the discharge conveyor 22″. The guide rollers 69″ are proceeding forwardly on their tracks 86″ and remain thereon during the forward travel of the pusher. As the pins 52″ travel around the front ends of the front sprockets 54″, the rake tines 48″ slow to a stop in their forward travel and thence move rearwardly a short distance as the pins 52″ commence to travel rearwardly on the upper runs of endless conveyors 53″. Soon, however, the arms 50″ engage and lift the boss portions 88″ and thereby lift the arms 68″ and swing the pusher arms 46″ upwardly. The rollers 69″ are free to move upwardly away from tracks 86″ when the arms 68″ are lifted. Thus, the arms 46″ and tines 48″ are carried rearwardly in raised position and have no difficulty in clearing the next succeeding tray, which is traveling forwardly to a position from which it will be discharged. When the pins 52″ commence to descend around the ends of the inner sprockets 54″, the arms 68″ are free to drop by gravity to lower the rake tines or fingers 48″ into a position behind the next tray to be unloaded. The rollers 69″, of course, drop with the arms 68″ to the tracks 86″.

In this embodiment of the invention, the tracks with flipper bars utilized in the embodiment of the invention shown in FIGURES 1–4 can be eliminated and a simpler, more efficient system results. In view of the angularity of the conveyor chains 53″, the pusher assembly is raised and lowered very gently.

It should be clear that the transfer apparatus described is highly practical in nature and well adapted to the needs of contemporary bakeries.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. In combination; a tray conveyor having spaced apart trays thereon movable along a generally longitudinal and a generally vertical run forming part of a conveyor circuit; a conveyor outside and adjacent the vertical run; a pusher including a shaft mounted for to and fro, and pivotal, movement; an endless drive conveyor having an upper run; a control arm connected to said shaft for swinging it upwardly; a longitudinal guide engaged by said control arm preventing lowering of said control arm but permitting said arm to move upwardly; and drive arm means, having a drive arm connection pivotally connecting said shaft and endless drive conveyor for moving said pusher to and fro, engaging and raising said control arm and thereby pivoting said pusher upwardly on the return stroke of said pusher when the drive arm connection to the endless drive conveyor is traveling on the upper run of the endless conveyor.

2. In combination; a tray conveyor having spaced apart trays thereon movable along a generally vertical run forming an end of a conveyor circuit; a conveyor near the generally vertical run; transfer means for transferring products between the trays and the conveyor, including a shaft mounted for to and fro, and swingable, movement; endless drive conveyor means having an upper run; control arm means connected to said shaft for swinging it upwardly; and drive arm means having a connection connecting said shaft and endless drive conveyor means for moving said transfer means to and fro, engaging and raising said control arm means and thereby swinging said transfer means upwardly on the return stroke of said transfer means when the drive arm means connection to the endless drive conveyor means is traveling on the upper run of the endless conveyor means.

3. In combination; a tray conveyor having spaced apart trays thereon movable along a generally longitudinal and a generally vertical run comprising an end of a conveyor circuit; a conveyor near the end of said generally longitudinal run; a pusher for transferring articles between the trays and conveyor, including a shaft with a forwardly extending pusher assembly fixed thereto mounted for to and fro, and pivotal, movement; and endless drive conveyor having a vertically inclined upper run; a control arm fixed to said shaft for swinging it upwardly; a longitudinal guide for said control arm preventing lowering of said control arm but permitting said arm to move upwardly; and drive arm means, pivotally connected to said shaft and having a connection pivotally connecting with said endless drive conveyor for moving said pusher to and fro, engaging and raising said control arm and thereby permitting said pusher upwardly on the return stroke of said pusher when the drive arm connection to the endless conveyor is traveling on the upper run of the endless drive conveyor.

4. In combination; a continuously moving tray conveyor having spaced apart trays thereon movable along a generally longitudinal and a generally vertical run; a discharge conveyor at the end of said generally longitudinal run; a pusher, including a shaft mounted for to and fro, and pivotal, movement, having forwardly extending arms fixed to said shaft with dependent tines; an endless drive conveyor having vertically inclined upper, and lower, runs; a control arm fixed to said shaft for swinging it upwardly; a longitudinal guide for said control arm preventing lowering of said control arm but permitting said arm to move upwardly; and drive arm means, having a connection pivotally connecting said shaft and endless drive conveyor for moving said pusher to and fro, engaging and raising said control arm and thereby pivoting said shaft and swinging said pusher tines upwardly on the return stroke of said pusher when the drive arm connection to the endless drive conveyor is traveling on the upper run of the endless drive conveyor, the pusher tines and control arm dropping under the force of gravity when the drive arm connection to the endless drive conveyor moves down to the lower run of the endless drive conveyor.

5. In combination; a tray conveyor having spaced apart trays thereon movable along a generally longitudinal and a generally vertical run forming one end of a conveyor circuit; a conveyor member adjacent and outward of the end of said conveyor circuit; transfer means including arm means with rake elements rigidly depending therefrom and having a guide member extending laterally therefrom; generally longitudinally extending track means laterally outward of the said runs for said guide member; and motor driven means connected with said transfer means for moving said arm means toward said conveyor member in a horizontal plane to transfer articles between said trays and said conveyor member, and lifting the arm means of said transfer means and traveling the arm means and rake elements rearwardly to original position; said transfer means including a second guide member extending therefrom, and second track means for said second guide member permitting lifting and lowering of said second guide member.

6. Transfer apparatus comprising; means for engaging an article to be transferred; driven means for moving said engaging means along a path from a first position to a second position; means also mounting said engaging means for movements to an article engaging position in said path and a position away from said path; means connecting said engaging means to said driven means for movements with and relative to said connecting means; abutment means carried by said engaging means and engageable by said connecting means upon relative movement of the latter and said engaging means at a time when said engaging means is in an article engaging position and said engaging means is returning to said second position, engagement between said connecting means and said abutment means shifting said engaging means away from said path; and means for driving said driven means.

7. Transfer apparatus comprising a carriage member having an article engaging means; an endless driven member having spaced apart first and second runs; link means connected to said endless member for movement therewith along said runs; means connecting said carriage member to said link means for movements of said link means with and relative to said carriage member; abutment means carried by said carriage member and engageable by said link means as the latter moves relatively to said carriage member from one of said runs to the other thereby terminating relative movement of said link means and said carriage member; and means for driving said driven member.

8. Transfer apparatus comprising article engaging means; an endless driven member movable in a continuous, closed path; link means pivotally connected adjacent one of its ends to said article engaging means and adjacent the other of its ends to said driven member for movement relative to said engaging means about said path; and abutment means carried by said engaging means for engagement by said link means in response to movement of the latter about a portion of said path to terminate relative movement of said link means and said engaging means and effect conjoint movement thereof.

9. Transfer apparatus comprising a carriage member having an article engaging means; means mounting said carriage member for movements along a substantially horizontal path from a first position to a second position; an endless driven member movable in a continuous orbital path having forward and reverse runs; link means pivotally connected adjacent one of its ends to said carriage member and adjacent its other end to said driven member for movement with said carriage member along the forward run of said orbital path and for movement relative to said carriage member; abutment means carried by said carriage member and engageable by said link means during movement of the latter about the return run of said orbital path of shift said carriage member away from said substantially horizontal path during return movement of said carriage member from said second position to said first position; and means for driving said driven member.

10. Transfer apparatus comprising: a pusher carriage member including a pusher for engaging an article to be transferred; article support means; oven tray conveyor means having a run passing adjacent said support means; means mounting said pusher carriage member for movement substantially horizontally forwardly from a rear position to a forward position to transfer articles between said tray conveyor means and article support means and for pivotal movement to move said pusher from a lowered article engaging position to a raised position; said carriage member including attached guide means; cooperating guide means on which said attached guide means travels forwardly limiting pivotal movement of said carriage means in a direction to lower said pusher; an endless driven member having upper and lower runs; means driving said endless member in a direction such that said lower run travels forwardly and said upper run travels rearwardly; link means connected to said endless member for movement therewith along said runs; means connecting said carriage member to said link means for movements of said link means with and relative to said carriage member; abutment means on said carriage member engageable by said link means as the later moves relatively to said carriage member along the said upper run of said endless member to pivot said carriage member and raise said pusher.

11. Transfer apparatus comprising: a pusher carriage member including a pusher arm with a transversely extending pusher bar thereon for engaging an article for be transferred; article support means; oven tray conveyor means having a run passing adjacent said support means; means mounting said pusher carriage member for movement substantially horizontally forwardly from a rear position to a forward position to transfer articles between said tray conveyor means and article support means and for pivotal movement to move said pusher from a lowered article engaging position to a raised position; said carriage member including transversely extending guide arm means; guide means on which said guide arm means travels forwardly limiting pivotal movement of said carriage means in a direction to lower said pusher; an inclined endless driven member having a front and a raised rear end and upper and lower runs; means for driving said endless member with the lower run traveling forwardly and the upper run traveling rearwardly; link means connected to said endless member for movement therewith along said runs; means connecting said carriage member to said link means for movements of said link means with and relative to said carriage member; abutment means on said carriage member engageable by said link means after said link means has ascended the front end of said endless conveyor and commenced to move relatively to said carriage member along the said upper run of said endless member to pivot said carriage member and raise said pusher.

12. In combination; a tray conveyor having spaced apart trays thereon movable along a generally longitundinal and a generally vertical run forming one end of a conveyor circuit; a conveyor member adjacent and outward of the end of said conveyor circuit; transfer means, including longitudinally extending pusher arm means with pusher means thereon, movable in a forward and rearward stroke and having a first guide means extending laterally therefrom; second guide means for said pusher; generally longitudinally extending first track means, laterally outward of the said runs, for said first guide means permitting said first guide means to function as a pivot; means connected with said transfer means for moving said transfer means forwardly toward said conveyor member in a substantially horizontal plane to transfer articles between said trays and conveyor member, and for operatively engaging said second guide means and lifting the transfer means to raised position at the end of the forward stroke of the transfer means; said means for moving said transfer means traveling the transfer means in raised position in the rearward stroke, said latter means including motor driven means connecting with said transfer means, and second track means for said second guide means.

13. In combination; a tray conveyor having spaced apart trays thereon movable along a generally longitudinal and a generally vertical run forming one end of a conveyor circuit; a conveyor member adjacent the end of said conveyor circuit; a transfer means, including longitudinally extending pusher arm means with pusher means thereon, movable in a forward and rearward stroke and including a guide means thereon; generally longitudinally extending track means for said guide means permitting said guide means to function as a pivot for said transfer means; said transfer means including a guide arm extending therefrom; and means for moving said transfer means forwardly toward said conveyor member in a generally horizontal plane to transfer articles between said trays and conveyor member and thence at the end of the forward stroke of the transfer means operatively engaging said guide arm to pivot said transfer means upwardly about said guide means, said means for moving said transfer means and engaging said guide arm holding said transfer means in upward position during its rearward stroke before permitting it to move down for its forward stroke; said latter means including a motor driven endless member having a crank arm connected with said transfer means.

14. In combination; a tray conveyor having spaced apart trays thereon movable along a generally longitudinal and a generally vertical run forming one end of a conveyor circuit; a discharge conveyor adjacent the end of said circuit; a pusher arm means having a guide member extending therefrom and including article engaging means extending angularly therefrom; generally longitudinally extending track means above said generally longitudinal run of the tray conveyor including hinged sections swingable to pass said guide member when approached from one direction; and a motor driven endless member connected with said pusher arm means for moving said pusher arm means forwardly to transfer articles from said trays to said discharge conveyor and return the pusher arm means.

15. In combination; an oven having inner side walls defining an oven chamber and at least one outer side wall spaced from one of said inner side walls to define a compartment removed from the direct heat of burners in the oven chamber; a tray conveyor having spaced apart trays thereon movable along a generally longitudinal and a generally vertical run within the oven chamber; a discharge conveyor adjacent one end of said generally longitudinal run; a pusher within the oven chamber having a portion extending into said compartment; a motor driven member in said compartment connected with said portion of the pusher for moving said pusher forwardly to transfer articles from said trays to said discharge conveyor and return the pusher; bearing means for swingably mounting said pusher on said member in said compartment; and means for controlling the position of said pusher; swinging the pusher upwardly at the end of its forward stroke and maintaining it substantially in raised position during its rearward stroke.

16. In combination; a tray conveyor having spaced apart trays thereon movable along a generally longitudinal and a generally vertical run; a conveyor adjacent said generally vertical run; a pusher bar having a guide member extending therefrom; and means for driving said pusher bar guide member forwardly toward said conveyor and rearwardly including a longitudinally extending motor driven endless member moving said bar to transfer articles between said conveyor and trays and having a generally longitudinal run with a portion immediately adjacent said conveyor sloping forwardly and vertically to move the product at a relatively slow speed forwardly initially.

17. The combination defined in claim 16 in which generally longitudinally extending track means in juxtaposed position relative to said conveyor is provided in the path of said pusher bar for raising the pusher bar substantially during its return stroke.

18. In combination; a tray conveyor having spaced apart trays thereon movable along a generally longitudinal and a generally vertical run forming one end of a conveyor circuit; a discharge conveyor adjacent and outward of the end of said conveyor circuit; a pusher including arm means with rake elements rigidly depending therefrom and having a guide member extending laterally therefrom; generally longitudinally extending track means laterally outward of the said runs receiving said guide member; motor driven means connected with said pusher arm means for moving said pusher arm means forwardly toward said discharge conveyor in a horizontal plane to transfer articles from said trays to said discharge conveyor and lifting the arm means of said pusher and traveling the arm means and rake elements rearwardly to original position; said arm means including a second guide member extending therefrom; and upper and lower track elements for said second guide member for lifting and permitting lowering of said second guide member; one of said track elements including a hinged section at its front end which can be swung upwardly out of the path of said second guide member to pass said second guide member and thence functions on the return stroke of said pusher to raise said second guide member and thereby said pusher.

19. Transfer apparatus comprising: means for engaging an article to be transferred; means for moving said engaging means along a substantially linear path from a rear position to a forward position; means also mounting said engaging means for movement from an article engaging position in said path to a position away from said linear path, and for return to said rear position; means, driven by said moving means, connecting said engaging means to said moving means for movement of said engaging means both with the moving means and relative thereto; abutment means carried by said engaging means and engageable by said connecting means at a time when said engaging means is disposed in said path upon relative movement of the connecting means and said engaging means to move said engaging means away from said path; and means for driving said moving means and moving said engaging means forwardly, also moving said connecting means into engagement with said abutment means to shift said engaging means away from said path when the engaging means reaches forward position.

20. Transfer apparatus comprising: article engaging means, movable to lowered and raised positions; means for moving said engaging means forwardly from a rear position to a forward position and for returning it to rearward position; means, driven by said moving means, connecting said engaging means to said moving means for movement with and relative to the moving means; means on said engaging means engageable by said connecting means at a time when said engaging means is in lowered position upon relative movement of the connecting means and engaging means to raise said engaging means; and means for driving said moving means and moving said engaging means forwardly, also moving said connecting means into engagement with said means on said engagement means engageable by said connecting means to raise said engaging means when the engaging means moves to forward position.

21. The combination defined in claim 20 in which said means for moving said engaging means comprises generally horizontally disposed endless means driven in an endless path.

22. The combination defined in claim 21 in which said endless means comprises an endless member with an upper run leading upwardly from its front end to its rear end.

23. Transfer apparatus comprising: article engaging means, pivotal to lowered and raised positions; means for moving said engaging means forwardly from a rear position to a forward position and for returning it to rearward position; means, driven by said moving means, connecting said engaging means to said moving means for movement with and realtive to the moving means; means on said engaging means engageable by said connecting means during rearward movement of said engaging means and upon relative movement of the connecting means and engaging means at a time when said engaging means is in lowered position to pivot said engaging means upwardly; and motor means for driving said moving means and moving said engaging means, also, during rearward travel of said engaging means, moving said connecting means into engagement with said means on said engaging means engageable by said connecting means to pivot said engaging means upwardly.

24. In combination: a tray conveyor having spaced apart trays thereon movable along a generally longitudinal and a generally vertical run; a discharge conveyor adjacent the end of said generaly longitudinal run; a pivotally mounted pusher arm means having article engaging pusher means extending therefrom; a motor driven, endless member below said arm means connected with said pusher arm means for moving said pusher arm means forwardly in a horizontal plane to transfer articles from said trays to said discharge conveyor and return the pusher arm means; and cam means engaged by said pusher arm means for controlling the travel of said pusher arm means raising the pusher arm means at the end of its forward stroke and maintaining it substantially in raised position during its rearward stroke.

25. In combination; a tray conveyor having spaced apart trays thereon movable along a generally longitudinal and a generally vertical run; a discharge conveyor having an article conveying surface substantially horizontally adjacent the end of said generally longitudinal run; said generally longitudinal run including a portion near said vertical run at a lowered level relative to said article conveying surface connecting with a generally longitudinal portion immediately adjacent said conveying surface at substantially the level of said discharge conveyor; a pusher; and motor driven means connected with said pusher for moving said pusher forwardly in a horizontal plane at the level of said discharge conveyor to transfer articles from one of said trays to said discharge conveyor and returning the pusher without interfering with the travel of a following tray.

26. In combination; a tray conveyor having spaced apart trays thereon movable along a generally longitudinal and a generally vertical run forming one end of a conveyor circuit; a conveyor adjacent and outward of the end of said conveyor circuit; transfer means, including longitudinally extending arm means with rake elements rigidly depending therefrom, movable in a forward and rearward stroke and having a guide member extending laterally therefrom; generally longitudinally extending track means, laterally outward of the said runs, for said guide member; a second guide member for said transfer means; motor driven means connected with said transfer means for moving said arm means toward said conveyor in a horizontal plane to transfer articles between said trays and said conveyor, and lifting the arm means of said transfer means to raised position at the end of its forward stroke and traveling the arm means and rake elements rearwardly to substantially original position in raised position; and second track means for said second guide member permitting lifting and lowering of said second guide member.

27. In combination; a tray conveyor having spaced apart trays thereon movable along a generally longitudinal and a generally vertical run forming one end of a conveyor circuit a conveyor member adjacent and outward of the end of said conveyor circuit; transfer means, including longitudinally extending pusher arm means with pusher means thereon, movable in a forward and rearward stroke and having a first guide means extending laterally therefrom; second guide means for said transfer means; generally longitudinally extending first track means laterally outward of the said runs for said first guide means permitting said first guide means to function as a pivot; motor driven endless means connected with said transfer means for moving said pusher means forwardly toward said conveyor member in a horizontal plane to transfer articles between said trays and conveyor member and return said transfer means to original position; said transfer means including second guide means extending therefrom; and means, including second track means, controlling said second guide means for raising said second guide means to pivot said transfer means about said first guide means to raised position at the forward end of its travel and return said transfer means rearwardly in said raised position.

28. In combination; a tray conveyor having spaced apart trays thereon movable along a generally longitudinal and a generally vertical run forming one end of a conveyor circuit; a conveyor member adjacent and outward of the end of said conveyor circuit; transfer means, including longitudinally extending pusher arm means with pusher means thereon, movable in a forward and rearward stroke and including a first guide means thereon; generally longitudinally extending track means for said first guide means permitting said first guide means to function as a pivot for said transfer means; motor driven endless means having a crank arm connected with said transfer means for moving said transfer means forwardly toward said conveyor in a generally horizontal plane to transfer articles between said trays and conveyor and to return said transfer means to original position; said transfer means including a second guide means extending therefrom; and means controlling said second guide means permitting movement of said transfer means generally horizontally toward said conveyor and at the conclusion of the said forward stroke raising said second guide means to pivot said transfer means about said first guide means to raised position and maintaining said transfer means in raised position during most of said rearward stroke.

References Cited by the Examiner

UNITED STATES PATENTS

| | | | |
|---|---|---|---|
| 2,111,700 | 3/38 | Stokes. | |
| 2,436,052 | 2/48 | Mueller et al. | 107—57.1 |
| 2,847,132 | 8/58 | Wittenberger | 214—18 |
| 2,900,927 | 8/59 | Engels et al. | 107—57.1 |
| 2,980,038 | 4/61 | Royer | 107—57.1 |
| 3,018,872 | 1/62 | Wittenberger | 198—24 |

WALTER A. SCHEEL, *Primary Examiner.*

JOSEPH D. SEERS, CHARLES A. WILLMUTH,
*Examiners.*